United States Patent [19]

Korenblit

[11] Patent Number: 4,990,055
[45] Date of Patent: Feb. 5, 1991

[54] DYNAMIC SEAL WITH FLUSHING PROTECTION OF STATIC SEAL

[75] Inventor: Izya Korenblit, Cincinnati, Ohio

[73] Assignee: ITT Corporation, New York, N.Y.

[21] Appl. No.: 385,596

[22] Filed: Jul. 25, 1989

[51] Int. Cl.⁵ .................... F01B 25/00; F01D 11/00
[52] U.S. Cl. ........................ 415/144; 415/168.2; 415/171.1; 415/230
[58] Field of Search ............. 415/170.1, 171.1, 173.1, 415/174.3, 299, 230, 173.7, 110, 111, 168.2, 168.3, 144; 277/3, 72 R, 71, 79, 70

[56] References Cited

U.S. PATENT DOCUMENTS

| | | | |
|---|---|---|---|
| 2,352,784 | 7/1944 | Geyer | 415/174.3 |
| 2,936,715 | 5/1960 | Southam et al. | 415/171.1 |
| 3,090,320 | 5/1963 | Hummer et al. | 277/71 |
| 3,168,871 | 2/1965 | Sieghartner | 415/230 |
| 3,198,529 | 8/1965 | Voitik | 277/3 |
| 3,474,734 | 10/1969 | Stogner | 415/230 |
| 3,549,277 | 12/1970 | Kiss et al. | 415/168.2 |
| 3,724,861 | 4/1973 | Lesiecki | 277/70 |
| 4,477,223 | 10/1984 | Giroux | 415/168.2 |
| 4,621,981 | 11/1986 | Lorett | 415/168.2 |
| 4,801,244 | 1/1989 | Stahl | 415/168 B |

FOREIGN PATENT DOCUMENTS 8303454 10/1983 PCT Int'l Appl. .................... 277/3

Primary Examiner—Edward K. Look
Assistant Examiner—Hoang Nguyen
Attorney, Agent, or Firm—Menotti J. Lombardi

[57] ABSTRACT

A flushing protection arrangement is provided between the static seal and the auxiliary impeller, so that when the pump is not operating the static seal will be protected by a flushing fluid.

11 Claims, 1 Drawing Sheet

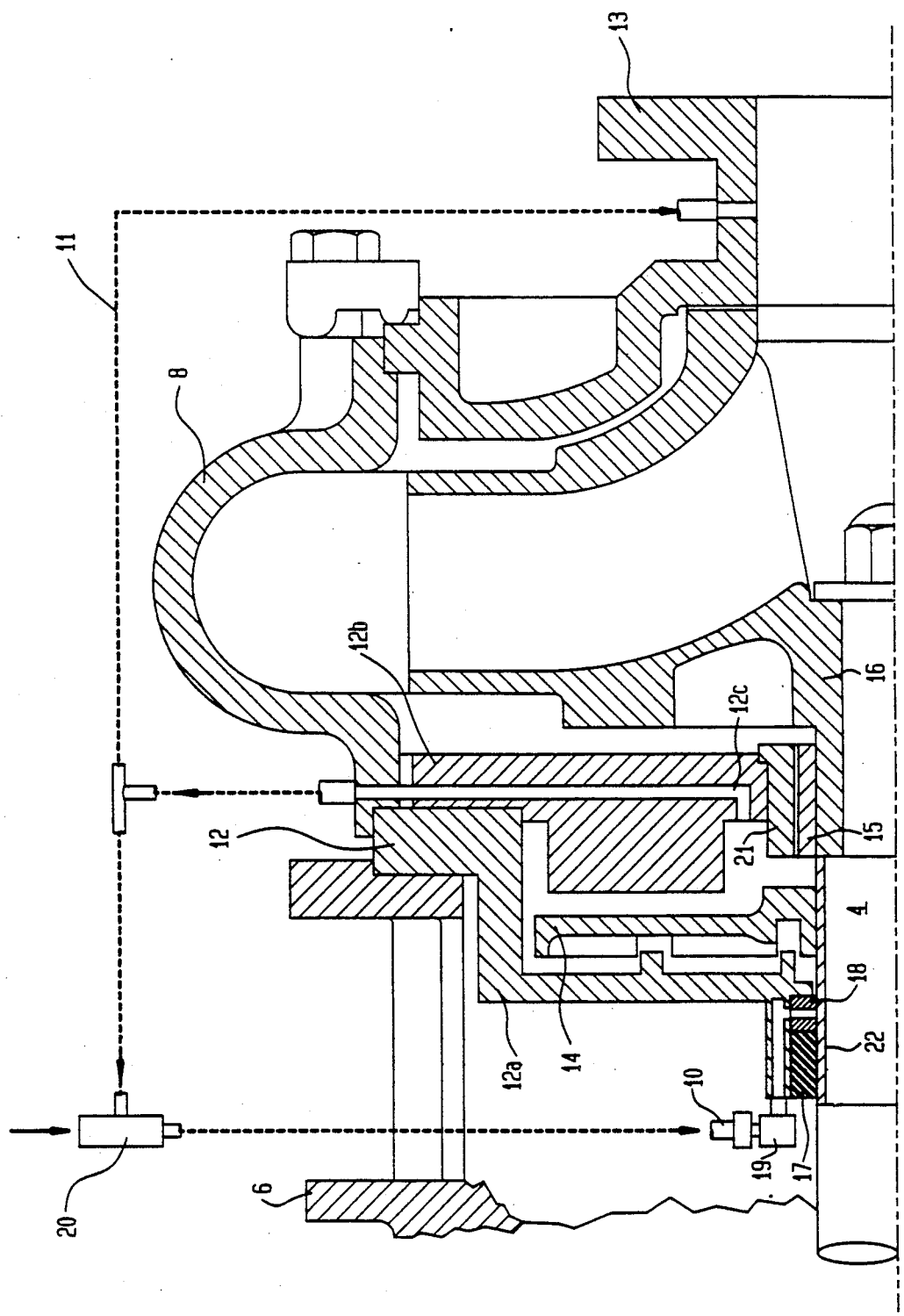

DYNAMIC SEAL WITH FLUSHING PROTECTION OF STATIC SEAL

BACKGROUND OF THE INVENTION

The invention relates to centrifugal pumps and more particularly to centrifugal pumps with dynamic seal and static seal arrangements.

A dynamic seal arrangement uses one or more auxiliary impellers in a centrifugal pump. As pumped fluid enters the dynamic seal stuffing box cavity, it is opposed by centrifugal force generated by the auxiliary impellers which prevent leakage of the fluid along the impeller shaft. When the pump is not operating, a static seal adjacent to the dynamic seal acts to prevent leakage in a known manner.

The number of dynamic seal stages depends of course on the stuffing box pressure, operating speed, and diameter of the auxiliary impeller. A conventional centrifugal pump has limited space between the inboard bearing and the pump impeller. Therefore, for many applications, dynamic seals with two or more stages cannot be used.

Another problem with such arrangements is to protect the static seal from contaminants. This becomes very critical and difficult for pumps used in applications where a high percentage of solids are present in the fluid being pumped.

SUMMARY OF THE INVENTION

It is an object of the invention to provide protection means for a static seal in a centrifugal pump having a dynamic seal arrangement.

Another object of the invention is to provide apparatus for use with a dynamic seal with a minimum number of auxiliary impellers and for protecting the static seal from contaminants.

According to the broader aspects of the invention, a flushing protection arrangement is provided between the static seal and the auxiliary impeller, wherein a flushing fluid to protects the static seal when the pump is not operating.

BRIEF DESCRIPTION OF THE DRAWING

This invention will become more apparent by reference to the following description taken in conjunction with the sole drawing which is a partial sectional view of a centrifugal pump with an auxiliary impeller and a static seal protection arrangement.

DETAILED DESCRIPTION OF THE PREFERRED EMBODIMENT

Referring to the drawing, a by-pass line 11 is connected between an enclosed stuffing box 12 and the suction end housing 13 of the pump. The dynamic seal stuffing box 12 consists of two parts, a dynamic seal housing 12a and a cover 12b, and is positioned between frame 6 and casing 8. Cover 12b has a channel 12c which is connected to the by-pass line 11. An auxiliary impeller 14 is mounted on impeller shaft 4 and is located within the cavity of stuffing box 12. A throttling device 15, 21 is located between auxiliary impeller 14 and pump impeller 16. The throttle device consists of a stationary bushing 21 and sleeve 15 which runs with a slight clearance there between. A static seal 17 which may be a conventional lip seal and flushing protection device 18 are fixedly located at the end of the stuffing box. The flushing protection device comprises a throttle bushing 18 and shaft sleeve 22 which runs with a slight clearance there between.

A flush liquid line 10 is coupled by end fitting 19 through cavity 12d in seal housing 12a which connect to the hole in bushing 18 and then to sleeve 22. A pressure control valve 20 which permits liquid input 2 to be connected to line 10. Valve is also connected to by-pass line 11. When the pump is running, auxiliary impeller 14 generates head pressure which forces fluid away from the static seal 17 area. By-pass line 11 will equalize the pressure between the suction end 13 of the pump and the cavity of the stuffing box 12 via channel 12c. Thus the pressure in the cavity of stuffing box 12 will be equal to suction pressure plus friction resistance in by-pass line 11 and channel 12c.

The throttle device 15, 21 reduces fluid flow through by-pass line 11 due to close tolerance between sleeve 15 and bushing 21. When the pump is not operating, the static seal will be exposed to the pressure of the system static head. The system pressure forces the contaminants into the static seal area. To prevent this action, the flushing protection device 18, 22 is installed between static seal 17 and the impeller 14. A small amount of clear liquid 2 is coupled to the area, for example, less than 0.1 gal./min., with a differential over by-pass pressure of approximately 1-2 psi. Pressure regulator 20 sets a differential over stuffing box pressure of approximately 1-2 psi. The differential pressure of 1-2 psi and the close tolerance between bushing 18 and sleeve 22 allows a small amount of clear liquid to flush the static seal area. The flushing liquid thus applied at bushing 18 serves as flushing protection. The constant flow of clean liquid will keep contaminants away from static seal 17.

While I have described my invention in connection with specific apparatus, this description is made only by way of example and not as a limitation to the scope of the invention as set forth in the objects thereof and in the accompanying claims.

What is claimed is:

1. In a centrifugal pump, apparatus comprising:
    a dynamic seal;
    a static seal;
    means positioned between said static and dynamic seals for providing flushing protection for said static seal;
    a by-pass line connected between a suction end housing of said pump and said dynamic seal;
    a flush liquid line coupled by end fitting means to said flushing protection means;
    pressure regulator means connected between said flush liquid line and said by-pass line;
    a throttling device located between said auxiliary impeller and the impeller of said pump; and
    said dynamic seal having an end cover having a channel which is connected to the by-pass line.

2. The apparatus of claim 1 wherein said flushing protection means includes a throttle bushing.

3. The apparatus of claim 2 including means for providing a flushing fluid to said flushing protection means when said pump is not operating.

4. The apparatus according to claim 3 wherein said dynamic seal includes a single auxiliary impeller.

5. The apparatus of claim 1 wherein said static seal is a lip seal.

6. In a centrifugal pump, apparatus comprising combination:

a dynamic seal having an auxiliary impeller;
a static seal;
a flushing protection means positioned between said static and dynamic seals so as to provide protection for said static seal when said pump is not operating;
said flushing protection means includes a throttle bushing and shaft sleeve;
means for providing a flushing fluid to said protection means when said pump is not operating;
a by-pass line connected between the suction housing of said pump and said dynamic seal;
a flush liquid line coupled by end fitting means to said flushing protection means;
pressure regulator means connected between said flush liquid line and said by-pass line;
a throttle device located between said auxiliary impeller and the impeller of said pump; and
said dynamic seal includes an end cover having a channel which is connected to the by-pass line.

7. The apparatus of claim 6 wherein said dynamic seal includes a seal housing having a cavity connecting said flush liquid line to said throttle bushing.

8. In a centrifugal pump, apparatus comprising:
an impeller;
a dynamic seal stuffing box comprising a dynamic seal housing and a cover;
an auxiliary impeller located within a cavity formed by said housing and cover;
a throttling device located adjacent said cover and between said auxiliary impeller and said impeller;
a static seal and a flushing protection device located adjacent said housing;
means to provide a flushing fluid said flushing protection device to protect said static seal from contaminants when said pump is not operating; and
a by-pass line connected between a suction end housing of said pump and said stuffing box, and
a flush liquid line coupled by end fitting means to said flushing protection device.

9. Apparatus of claim 8 wherein said flushing protection device includes a throttle bushing and shaft sleeve.

10. Apparatus of claim 8, including pressure regulator means connected between said flush liquid line and said by-pass line.

11. Apparatus of claim 8, wherein said flushing protection device includes a throttle bushing and a shaft sleeve which runs with a slight clearance therebetween.

* * * * *